United States Patent [19]
Kerecz, Jr.

[11] 3,749,245
[45] July 31, 1973

[54] LABORATORY DIGESTION TANK

[75] Inventor: Bela J. Kerecz, Jr., Bethlehem, Pa.

[73] Assignee: Bethlehem Steel Corporation, Bethlehem, Pa.

[22] Filed: Apr. 23, 1971

[21] Appl. No.: 136,688

[52] U.S. Cl. .............. 210/180, 23/230, 23/253, 210/12, 210/537
[51] Int. Cl. ............................................. C02c 1/14
[58] Field of Search .............. 23/230 R, 230 B, 23/253; 210/2-18, 175, 180, 181, 537

[56] References Cited
UNITED STATES PATENTS

| | | | |
|---|---|---|---|
| 3,529,529 | 9/1970 | Schumacher | 23/230 R X |
| 3,662,918 | 5/1972 | Crawford et al. | 210/532 S |
| 1,649,028 | 11/1927 | Gutman | 210/532 S X |
| 3,338,826 | 8/1967 | Kramer | 210/12 |

OTHER PUBLICATIONS

Hert, O. H., Research in Anaerobic Treatment, etc., Proc. Fourth Ind. Waste Conf., Purdue Univ., 1948, pp. 141–149. (P.O.S.L.).

Primary Examiner—Michael Rogers
Attorney—Joseph J. O'Keefe

[57] ABSTRACT

Method and apparatus for obtaining samples under carefully controlled conditions of the products of digestion of materials in the anaerobic decomposition of said materials.

6 Claims, 2 Drawing Figures

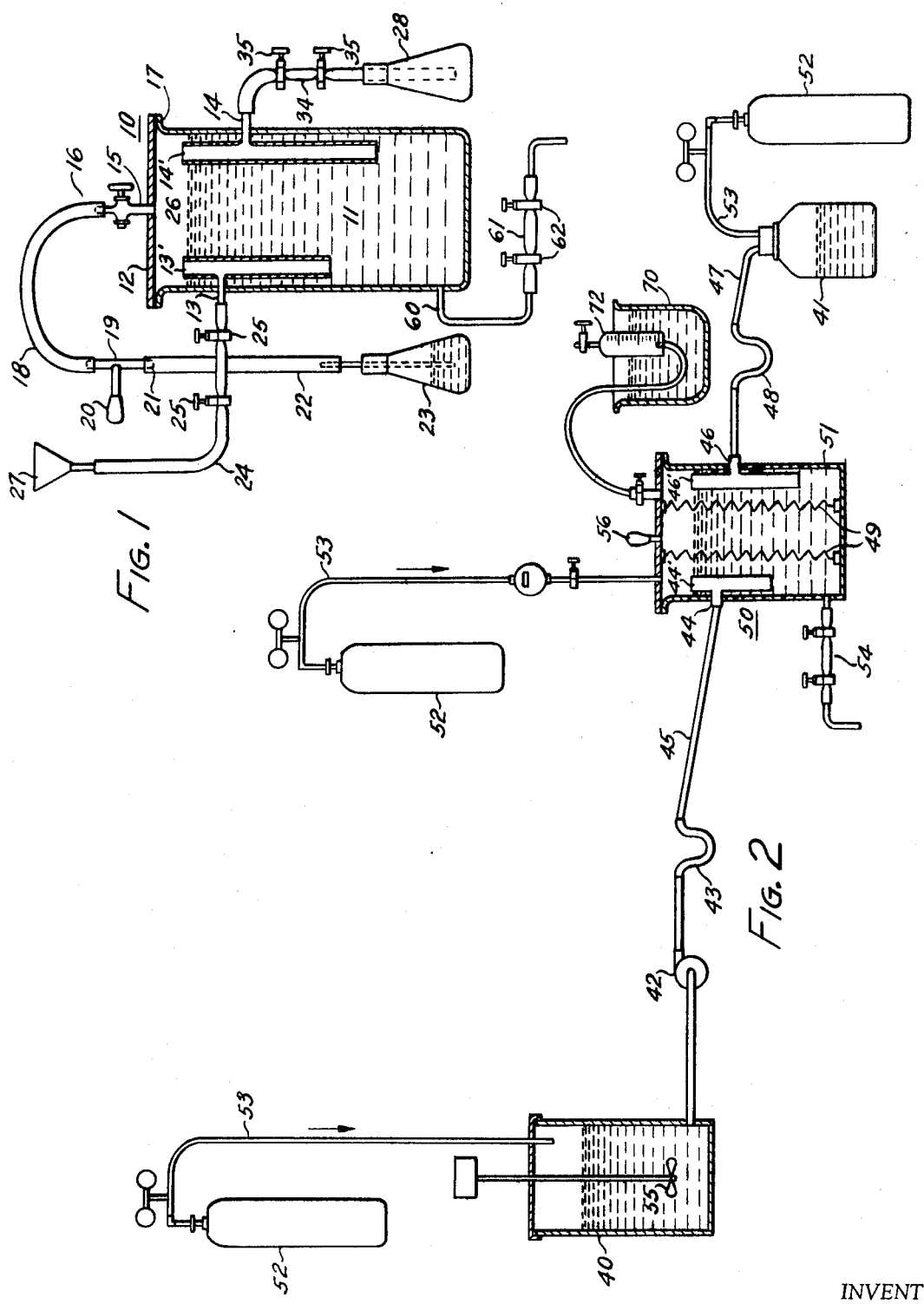

LABORATORY DIGESTION TANK

BACKGROUND OF THE INVENTION

The present invention relates to laboratory procedures and apparatus for studying the anaerobic decomposition of various materials, and more particularly to means for measuring the quantities of influents, effluents and off-gases produced.

It is essential in many laboratory procedures and particularly so in testing the biodegradability of organic and inorganic materials to carefully measure the amounts of the input materials and the products of digestion thereof which are withdrawn from the test apparatus.

Biodegradability is defined as . . . "the ease with which matter may be broken down by living organisms; specifically, the rate at which detergents may be decomposed by bacteria in sewage disposal plants." The present invention is directed to a laboratory apparatus which is designed and fabricated to follow the anaerobic decomposition of such compounds as sodium nitrilotriacetate (SNTA) and sodium carbamoylmethyliminodiacetate (SAND).

The equipment design permits careful measurement of quantities of influents, effluents, and off-gases produced in the anaerobic decomposition of materials tested. The tank is designed to provide baffles so as to retain the major portion of solids introduced into the settling compartment when the unit is run batchwise, semi-batch, or continually.

It is an object of this invention, therefore, to provide laboratory apparatus which carefully controls the decomposition of materials.

It is a further object of the invention to provide a method for obtaining accurately measured samples of the products of digestion of materials.

SUMMARY OF THE INVENTION

The instant invention accomplishes these objects by uniquely designed apparatus comprising a digestion chamber having means for carefully controlling the introduction of material thereinto while withdrawing an equal amount of effluent therefrom. Means are also provided to collect off-gases, maintain the temperature within the digestion chamber and guarantee an anaerobic atmosphere therein.

BRIEF DESCRIPTION OF THE DRAWINGS

FIG. 1 is a detailed elevational view of the apparatus of the invention.

FIG. 2 is an elevational view of the apparatus of the invention incorporated in a continued operation.

DESCRIPTION OF THE PREFERRED EMBODIMENT

The tank 10 of the instant invention as seen in the FIGURES and more particularly FIG. 1 comprises a receptacle or digestion chamber 11, cover 12, inlet 13, outlet 14, gas outlet 15, and gas collecting means 16. Baffles 13' and 14' are mounted in the digestion chamber 11 at the inlet 13 and outlet 14 and spaced therefrom, respectively, for reasons that will become apparent. The invert of the outlet 14 is positioned about 1 inch below the invert of the inlet 13 to guarantee flow through the tank. The chamber 11 is preferably constructed of pyrex glass so that some estimate of septicity, amount of floating scum, liquid level and depth of bottom sludge can be made visually through the tank wall. It should be understood that the glass is not vital to the anaerobic decomposition of the material introduced into the chamber 11 as many other construction materials would be suitable.

The tank 10 is essentially a single stage reactor into which samples to be tested are introduced and held sufficiently long to undergo partial and possibly complete anaerobic digestion. The inlet baffle 13' and outlet baffle 14' insure that gas-lifted solids undergoing anaerobic digestion and floating scum will not pass out through the inlet and outlet ports of the tank.

The cover 12 for the digestion chamber 11 is positioned on the ground glass lip 17 at the top of the chamber 11 and sealed thereon with a material such as vacuum grease to provide an airtight seal. Gas outlet 15 is a glass stopcock located on the top of cover 12 for controlling the flow of gaseous product of digestion and so that samples of exit gases can be measured and periodically withdrawn from the receptacle 11 for analysis by standard techniques. Tubing 18 connects the glass stopcock 15 to a glass tee 19. A rubber sampling septum 20 is positioned on one stem of the tee 19 so that gas samples can be withdrawn through the septum 20 by means of a syringe, avoiding the introduction of extraneous air into the septic tank. Tube 22 connects the remaining leg 21 of the tee 19 to water seal 23. Leg 21 can also be used to measure gas volumes using standard methods.

Flexible tubing 24 and clamps 25 are provided at inlet 13 and tubing 34 and clamps 35 at outlet 14. The tubings 24 and 34 are filled with water between the clamps 25 and 35 respectively to prevent contamination by air when samples are being introduced into the digestion chamber 11 or withdrawn therefrom. An airtight receptacle is thus provided in which wastewater feed material is allowed to digest. Space 26 in the top of the tank provides a large reservoir for off-gases produced during the anaerobic decomposition and also prevents the light floating layer from being compressed.

Feed funnel 27 is connected by tubing 24 to the inlet 13 and provides for the introduction of the material being tested. An effluent container 28 is positioned adjacent the outlet 14 and is connected thereto by tubing 34 for the purpose of collecting a sample of the liquid effluent from the digestion chamber 11.

An outlet 60 may be provided near the bottom of the receptacle 11 with tubing 61 and clamps 62 to provide a means for taking samples of the sludge collecting at the bottom of the receptacle or digestion chamber. A similar outlet 54 is provided on receptacle 51 in the apparatus of FIG. 2.

In operation: the start-up procedure is generally the same whether the material is being tested batch, semi-batch or continuously. Organic sludge is obtained from some good source, as e.g., municipal or industrial sewage treatment facilities such as primary digesters, Imhoff tanks or primary sedimentation tanks. The sludge thus obtained is introduced into the laboratory tank 10 so that 5 to 25 percent of the tank liquid capacity is a mixture of anaerobic sludge and fresh inorganic solids. The mixture may be seeded with bactrial culture if necessary. The laboratory tests conducted in the development of this invention used as the starting solids a mixture of 50 percent anaerobic digester solids from Plant A waste water treatment plant digesters and 50 percent organic sewage solids from the primary sedimentation tanks at Plant A. Plant A is a typical municipal sewage treatment plant serving a community of approximately 120,000 people. 50 to 70 percent of the sludge solids obtained are volatile.

The feed used in the tests was sewage obtained from Plant B wastewater treatment plant spiked with SNTA and SAND. Synthetic wastewater feeds can also be used and a recipe therefor appears in Table 2. The desired BOD (biochemical oxygen demand) of 100–200 mg/1 was used. The feed wastewater material to be tested was added to the tank 10 through feed funnel 27 by carefully manipulating clamps 25 and 35. The system was closed to the atmosphere using the appropriate water seals 24 and 34 and screw clamps 25 and 35. The tank and its contents were brought to the test temperature at which the study of anaerobic decomposition was desired.

The wastewater feed was added at a predetermined rate either batchwise or continuously. The time at which the feed is started varies according to whether the system is to be completely anaerobic or only partially so. The anaerobic condition of the material in the tank can be determined by sampling the exit gases or by using an organic indicator, e.g., methylene blue, to check the anaerobic conditions inside the tank.

Based on the startup procedure thus described, the system will be anaerobic in thirty days or less. A detention time of from 20 to 40 days should be used to study the anaerobic decomposition of organic materials in the tank.

Samples of the wastewater feed, effluent, and gases are readily available through means provided by the invention and are taken routinely for analyses.

BATCH OPERATION

The laboratory tank 10 used in this example has a liquid capacity of 3 liters with an air space for exit gases of about 1 liter. Since the tanks are designed to operate at a detention time of 30 days the wastewa4er feed material is added periodically to the receptacle at a first point, e.g., inlet 13 at a rate of 100 ml/day while withdrawing a controlled 100 ml/day of product of digestion from the receptacle at a second point e.g., outlet 14, simultaneously. The wastewater feed material is introduced into the tank digestion chamber 11 at the same time an effluent sample is withdrawn by carefully manipulating the clamps 25 adjacent the inlet port 13 and clamps 35 adjacent the outlet port 14 thus preventing air from being introduced into the tank. A simple way of determining the speed of the sample introduction into the tank is to watch the gas water seal 23. If air bubbles from the water seal 23 faster than normal off-gas production, the sample is being introduced faster than the effluent sample is being withdrawn at outlet 14 and either the feed should be reduced or the effluent should be withdrawn at an increased rate. This can be easily and readily regulated by the adjustable screwclamps 35 on the flexible tubing 34 adjacent the outlet 14 and effluent container 28. Likewise the rate of introduction of wastewater feed is controlled by adjustable screwclamps 25 and flexible tubing 24 adjacent the inlet 13 and funnel 27.

The water seal 23 will also indicate when liquid sample is being withdrawn too fast from the tank when it is noted visually that the water is backing up in the water seal leg indicating that more effluent sample is being withdrawn than feed sample is introduced. Again the clamp adjustments hereinbefore described are used.

In between periods of sample introduction and withdrawal the water seals at 23, 24 and 34 are maintained. The water seals are important to prevent contamination by air in a negative pressure situation where a drop in temperature in the tank would cause gases and liquid to contract substantially.

In order to maintain the integrity of off-gases produced in the tank 10 the feed is introduced into the tank at the same time an effluent sample is withdrawn by carefully manipulating the screwclamps on the feed and effluent ports as hereinbefore described. Wastewater feed and effluent samples are analyzed for contaminants on a regular basis. Samples of exit gases are taken routinely so the off-gases from the anaerobic digestion of the materials under study can be determined. The off-gases are sampled through the rubber septum 20 on the glass tee 19 by a syringe and then analyzed by standard techniques.

The tank 10 is provided with baffle 13' at inlet 13 and baffle 14' at outlet 14 to prevent short circuiting by the wastewater and organic solids introduced into the tank and to prevent the passage of the floating scum from the top of the liquid in the digestion chamber 11 through the outlet 14.

The following table of gas analyses from a laboratory septic tank covers a typical startup period.

TABLE 1

| Gas | Percent concentration—Weekly samples at— | | | | | | |
|---|---|---|---|---|---|---|---|
|  | 1st week | 2d week | 3d week | 4th week | 5th week | 6th week | 7th week |
| Carbon dioxide ($CO_2$) | 26.08 | 29.56 | 30.79 | 31.93 | 28.37 | 27.79 | 23.59 |
| Argon (Ar) | 0.77 | 0.73 | 0.63 | 0.43 | 0.40 | 0.34 | 0.31 |
| Oxygen ($O_2$) | 0.97 | 1.03 | 1.18 | 1.00 | 1.68 | 0.89 | 1.79 |
| Hydrogen sulfide ($H_2S$) |  |  | 0.01 |  |  | 0.01 |  |
| Water vapor ($H_2O$) | 0.15 | 0.09 | 0.23 | 0.17 | 0.08 | 0.37 | 0.11 |
| Methane ($CH_4$) | 10.22 | 10.81 | 17.78 | 32.35 | 40.08 | 48.23 | 53.49 |
| Nitrogen ($N_2$) | 61.10 | 57.79 | 49.38 | 32.12 | 29.38 | 22.36 | 20.79 |
| Hydrogen ($H_2$) |  |  |  |  |  |  |  |

CONTINUOUS OPERATION

In a continuous operation as shown in FIG. 2 there are a number of problems attendant therewith that do not occur when operating on a batch or semi-batch basis. The tank 10 operates similarly on a continuous basis except that a continuous flow is maintained through the tank.

Wastewater feed and effluent sample should be stored at a low temperature if the sample will change significantly on standing and a nitrogen gas or other inert gas blanket should be maintained on both wastewater feed material in storage vessel 40 and effluent in container 41 to prevent oxidative reactions from occurring.

The tank 10 is designed to provide a detention time of 20 to 40 days. The detention time can be varied by increasing or decreasing the wastewater feed flow by means of a variable-speed proportioning pump 42 feeding real or synthetic wastewater.

A glass water trap 43 is provided between the pump 42 and the inlet 44. A slope of 1 inch per foot is provided in the line 45. A minimum 3 inch drop must be maintained to provide enough hydraulic pressure so that the wastewater feed will flow into the tank.

A 1 inch drop through the tank is provided since the invert of the outlet 46 is 1 inch lower than the invert of the inlet port 44. The wastewater must, therefore, flow through the tank. Baffle 44' and baffle 46' are provided at inlet 44 and outlet 46 respectively similar to the tank of FIG. 1 so that there will be no short circuiting of solids or liquids introduced into the tank.

Between the outlet port 46 and the effluent sample container 41 another glass water trap 48 is provided. The outlet tubing 47 also has a 1 inch per foot slope after the outlet water trap 48. A minimum drop of 3 inches into the effluent container 41 is required. An inert gas atmosphere such as nitrogen is provided above the effluent level in the effluent container 41 to minimize oxidative reactions. The container 41 may be refrigerated to slow down bacterial activity or a bactericide may be added to the waste-water to stop biodegradation of soluble organics left in the effluent.

Heating elements 49 are provided in the tank 50 for controlling the temperature within the airtight tank receptacle 51.

Refrigeration means may also be provided for the wastewater feed storage vessel 40 if desired. A stirring mechanism 55 is provided in vessel 40 to keep any solid material uniformly dispersed in wastewater feed solution.

The inert gas atmosphere is provided by gas cylinders 52, containing inert gas such as nitrogen, which are connected by suitable tubing 53 to the areas where an inert atmosphere is desired.

Experiments are conducted at ambient temperature in a laboratory hood. The bacteria in the tank normally grow in the psychophilic through the mesophilic temperature range (0° C through 37.8° C), the higher temperatures being more conducive to anaerobic digestion. In other tests, temperatures may be controlled at higher or lower levels by either thermostatically controlled heating mantles or refrigeration units. If tests are to be conducted at various temperatures the temperature changes should be made gradually because methane bacteria are easily upset by sudden temperature differences. A change of not more than 1° C during any 24 hour period is recommended.

The exit gases not sampled by a syringe through the rubber septume 20 in FIG. 1 apparatus or 56 in FIG. 2 apparatus, may exit the closed system through the water seal at 23 or 70, FIGS. 1 and 2, respectively. A gas meter may be located at this position so that off gases can be measured volumetrically. Volumetric sampling is also possible through the water displacement tube 72 shown at 70 as will be appreciated by those skilled in the art. A stop cock is provided as shown for taking gas samples.

Radioactive organic materials may be used in the wastewater feed samples. SAND and SNTA with tagged carbon atoms (C-14) are added in solution with the sewage feed. The samples will have material with both number one carbon tagged and material with number two carbon tagged. These organic molecules will be added in solution with the sewage feed and as they biodegrade they will exit on methane gas molecules. Gas analyses will show radioactive methane produced if the SAND and SNTA compounds biodegrade anaerobically.

TABLE 2

Synthetic Wastewater Feed

| | |
|---|---|
| $NH_4Cl$ | 3.0 gram (g.) |
| $K_2HPO_4$ | 1.0 g. |
| $MgSO_4 \cdot 7H_2O$ | 0.25 g. |
| $KCl$ | 0.25 g. |
| $FeSO_4 \cdot 7H_2$) | 0.002 g. |
| Yeast Extract | 0.3 g. |
| Nutrient Broth | 0.3 g. |
| Distilled Water | 1.0 liter |

I claim:

1. Apparatus for obtaining samples of products of digestion of material, comprising:
   a. an airtight digestion chamber for the anaerobic bacterial digestion of said material,
   b. an inlet proximate the upper end of said digestion chamber provided with means to prevent contamination of said material by air when material is being introduced into said digestion chamber and having an invert spaced from the bottom of said chamber,
   c. an outlet proximate the upper end of said digestion chamber provided with means to prevent contamination of said material by air when material is being withdrawn from said digestion chamber and having an invert positioned below the invert of said inlet,
   d. baffle means mounted in said chamber for each of said inlet and said outlet and spaced therefrom,
   e. gas collecting means communicating with the upper end of said chamber,
   f. gas sampling means mounted in said gas collecting means, and
   g. effluent sampling means adjacent said outlet.

2. Apparatus according to claim 1 further including:
   h. means to control the temperature within said chamber.

3. Apparatus according to claim 2 further including:
   i. sludge sampling means.

4. Apparatus according to claim 3 including:
   j. means to provide an inert atmosphere in said digestion chamber.

5. Apparatus according to claim 2 further including:
   i. sludge sampling means, and
   j. means to provide an inert atmosphere in said digestion chamber.

6. Apparatus for obtaining samples of products of digestion of material, comprising:
   a. a storage vessel for said material,
   b. means to provide an inert atmosphere in said storage vessel,
   c. means to control the temperature within said storage vessel,
   d. a digestion chamber for the anaerobic bacterial digestion of said material,
   e. an inlet proximate the upper end of said digestion chamber having an invert spaced from the bottom of said chamber,
   f. an outlet proximate the upper end of said digestion chamber having an invert positioned below the invert of said inlet, g. baffle means mounted in said chamber for each of said inlet and said outlet and spaced therefrom,
h. gas collecting means communicating with the upper end of said chamber,
i. gas sampling means mounted in said gas collecting means,
j. an effluent container adjacent said outlet,
k. an outlet proximate the bottom of said digestion chamber for sampling sludge,
l. means to provide an inert atmosphere in said digestion chamber,
m. means to provide an inert atmosphere in said effluent container,
n. means to control the temperature within said digestion chamber,
o. means to control the temperature of said effluent container,
p. pump means to supply a continuous flow of said material from said storage vessel to said digestion chamber, and
q. water seal means between said storage vessel and said digestion chamber, and between said digestion chamber and said effluent container.

* * * * *